US007231351B1

(12) United States Patent
Griggs (10) Patent No.: US 7,231,351 B1
(45) Date of Patent: Jun. 12, 2007

(54) TRANSCRIPT ALIGNMENT (75) Inventor: Kenneth King Griggs, Roswell, GA (US)

(73) Assignee: Nexidia, Inc., Atlanta, GA (US)

( * ) Notice: Subject to any disclaimer, the term of this patent is extended or adjusted under 35 U.S.C. 154(b) by 155 days.

(21) Appl. No.: 10/384,273

(22) Filed: Mar. 7, 2003

Related U.S. Application Data (60) Provisional application No. 60/379,291, filed on May 10, 2002.

(51) Int. Cl.
*G10L 15/08* (2006.01)
*G10L 15/00* (2006.01)

(52) U.S. Cl. .................. 704/251; 704/257; 704/243
(58) Field of Classification Search ............. 704/211, 704/235, 243, 251, 278; 705/8; 348/14.1
See application file for complete search history.

(56) References Cited

U.S. PATENT DOCUMENTS

| 5,199,077 | A |   | 3/1993  | Wilcox et al. |
| 5,333,275 | A | * | 7/1994  | Wheatley et al. ........... 704/243 |
| 5,649,060 | A | * | 7/1997  | Ellozy et al. ............... 704/278 |
| 5,701,153 | A | * | 12/1997 | Reichek et al. ............. 348/14.1 |
| 5,787,414 | A |   | 7/1998  | Miike et al. |
| 5,822,405 | A |   | 10/1998 | Shaun |
| 6,023,675 | A | * | 2/2000  | Bennett et al. ............. 704/235 |
| 6,076,059 | A | * | 6/2000  | Glickman et al. .......... 704/260 |
| 6,260,011 | B1 |  | 7/2001  | Heckerman et al. |
| 6,317,710 | B1 |  | 11/2001 | Huang et al. |
| 6,345,253 | B1 |  | 2/2002  | Viswanathan |
| 6,505,153 | B1 | * | 1/2003 | Van Thong et al. ........ 704/211 |
| 2002/0143544 | A1 | * | 10/2002 | Gschwendtner ............ 704/260 |

FOREIGN PATENT DOCUMENTS

GB     000877378 A2 *  11/1998

OTHER PUBLICATIONS

Clements et al., "Phonetic Searching of Digital Audio," Broadcast Engineering Conference, Las Vegas, Nevada, Apr. 2001, pp. 1-10.*
Hauptmann et al., "Text, Speech, and Vision for Video Segmentation: The Informedia Project," AAAI, Fall 1995, pp. 1-6.*

(Continued)

*Primary Examiner*—V. Paul Harper
(74) *Attorney, Agent, or Firm*—Occhiuti Rohlicek & Tsao LLP (57) ABSTRACT

An approach to alignment of transcripts with recorded audio is tolerant of moderate transcript inaccuracies, untranscribed speech, and significant non-speech noise. In one aspect, a number of search terms are formed from the transcript such that each search term is associated with a location within the transcript. Possible locations of the search terms are then determined in the audio recording. The audio recording and the transcript are then aligned using the possible locations of the search terms. In another aspect a search expression is accepted, and then a search is performed for spoken occurrences of the search expression in an audio recording. This search includes searching for text occurrences of the search expression in a text transcript of the audio recording, and searching for spoken occurrences of the search expression in the audio recording.

23 Claims, 8 Drawing Sheets

OTHER PUBLICATIONS

Moreno et al., "A recursive algorithm for the forced alignment of very long audio segments," ICSLP-1998, pp. 1-4.*

Boreczky et al. "A Hidden Markov Model Framework for Video Segmentation Using Audio and Image Features," *Proc. ICASSP'98* (1998).

Brown, et al. "Open Vocabulary Speech Indexing For Voice and Video Mail Retreival," *Proc. of ACM Multimedia* pp. 307-316 (1996).

Choi et al. "SCAN—Speech Content based Audio Navigator: A systems overview," *Proc. ICSLP'98* (1998).

Cooper, et al. "Building Searchable Collections of Enterprise Speech Data,".

deVries "Radio and Television Information Filtering through Speech Recognition,".

Dharanipragada, et al. "Audio-Indexing For Broadcasting News," *Proceedings of TREC6* (1997).

Dharanipragada, et al. "Experimental Results in Audio Indexing," *Proceedings of TREC6* (1997).

Foote, et al. "An Overview of Audio Information Retrieval," *ACM-Springer Multimedia Systems* (1998).

Gelin, et al. "Keyword Spotting for Video Soundtrack Indexing," *Proc. IEEE ICASSP'96* vol. 1: pp. 299-302 (1996).

Hirschberg, et al. "Finding Information In Audio: A New Paradigm For Audio Browsing and Retrieval," *In Proceeding of the ESCA ETRW Workshop* (1999).

Kimber, "Speaker Segmentation for Browsing Recorded Audio," *Proc. ACM CHI'95* (1995).

Makhoul et al., "Speech and Language Technologies for Audio Indexing and Retrieval," *Proc. IEEE*, 88(8), pp. 13381353 (2000).

Roy, et al. "Audio Meeting History Tool: Interactive Graphical User-Support for Virtual Audio Meetings," *Proceedings of ESCA Workshop on Accessing Information in Spoken Audio*, pp. 107-110 (1999).

Roy, et al. "Speaker Identification Based Text to Audio Alignment For An Audio Retrieval System," *Proc. of the Int. Conf. Acoustics, Speech and Signal Processing* vol. 2: pp. 1099-1103 (1997).

\* cited by examiner

FIG. 1

Main algorithm:

- Read the transcript file
- For each line of the transcript
  o Convert the line into the "full line" search term
    - ex: "This is the line." becomes "This is the line"
  o Use the search engine to search for all occurrences of the "full line" search term in the audio file
  o Convert the line into the "full line with pauses" search term
    - ex: "This is the line." becomes "This [PAU] is [PAU] the [PAU] line"
  o Use the search engine to search for all occurrences of the "full line with pauses" search term in the audio file
  o Convert the line into the "two word" search term
    - ex: "This is the line." becomes "This is"
  o Use the search engine to search for all occurrences of the "two word" search term in the audio file
- For each gap width ("very high", "high" and "medium")
  o For each search term ("full line", "full line with pauses", and "two word")
    - For each contiguous group of unaligned lines
      • Use Gap Alignment to align these unaligned lines within the time window given by the bracketing aligned lines
      • Fix the tentative result selections returned by Gap Alignment as definite result selections.
        o Those unaligned lines for which Gap Alignment returned result selections become aligned lines
      • Accumulate the confidence score from each definitely selected result into a running total

FIG. 2A

- For each minimum score ("high", "medium" and "low")
    o For each search term ("full line", "full line with pauses", and "two word")
        - For each contiguous group of unaligned lines
            - Use Optimized Alignment to align these unaligned lines within the time window given by the bracketing aligned lines
            - Fix the tentative result selection returned by Optimized Alignment as definite result selections
                o Those unaligned lines for which Optimized Alignment returned result selections become aligned lines
            - Accumulate the confidence score from each definitely selected result into a running total
- For each contiguous group of unaligned lines
    o Use Blind Alignment to align these unaligned lines within the time window given by the bracketing aligned lines
        - Note: Blind Alignment does not select search results, so there are no tentative selections to be made definite. Instead, Blind Alignment "aligns" unaligned lines by simply assigning them time offsets. The accumulated total confidence score is unaffected during Blind Alignment. All remaining unaligned lines become aligned lines in this step.
- For each line of the transcript with no spoken text
    o Assign this line the time offset of the next line with spoken text.
- Compute the overall alignment confidence score by dividing the accumulated total of the selected confidence scores by the total number of spoken lines in the transcript
- Done – return the overall alignment confidence score

FIG. 2B

Gap Alignment

Given: start time, end time, start line, end line, gap width, search term

- Ignore all lines in the transcript that are before the given start line or after the given end line or which contain no spoken text
- Ignore all search results for search terms other than the given search term and all search results that occur before the given start time or after the given end time
- Ignore all remaining lines for which the highest remaining result score is below the "gap alignment minimum score threshold"
- Ignore all remaining lines for which the difference between the highest remaining result score and the next highest remaining result score (this difference is the "gap") is less than the given minimum gap width
- If there are no lines that haven't been ignored above, return a score of 0 and no tentative selections
- Tentatively select the line with the largest gap and compute the "gap alignment score" for it:
    o start with the score for the highest remaining result for this line
    o add the resulting score from recursively calling Gap Alignment on all lines from the given start line to this line, and from the given start time to the time offset of the highest remaining result for this line
    o add the resulting score from recursively calling Gap Alignment on all lines from the this line to the given end line, and from the time offset of the highest remaining result for this line to the given end time
- Separately from the above, tentatively select the line with the second-largest gap and compute the "gap alignment score" for it
- Return the highest score computed above, along with the tentative selection that produced it and all of the tentative selections returned by its associated recursive calls.

FIG. 3

Optimized Alignment

Given: start time, end time, start line, end line, minimum score, search term

- Ignore all lines in the transcript that are before the given start line or after the given end line or which contain no spoken text
- Ignore all search results for search terms other than the given search term and all search results that occur before the given start time or after the given end time
- If the number of lines between the start line and the end line are greater than the maximum number of lines for optimization:
    - If there are no lines with remaining search results above the given minimum score, return a score of 0 and no tentative selections
    - Otherwise, find the line with the largest "gap" (difference between the highest-scoring and second-highest-scoring search results)
        - Tentatively select this line and compute the score to return, starting with the score of the highest result for this line
        - Add the score returned from recursively calling Optimized Alignment on all lines from the given start line to this line, and from the given start time to the time offset of the highest remaining result for this line
        - Add the score returned from recursively calling Optimized Alignment on all lines from this line to the given end line, and from the time offset of the highest remaining result for this line to the given end time
        - Return the computed score, along with this tentative selection and all of the tentative selections from each of the recursive calls

FIG. 4A

- Otherwise, if there is only one line to be aligned, tentatively select the highest-scoring remaining search result and return its score
- Otherwise, tentatively select in turn each result for the given start line that has not been ignored and compute a "optimization score" for it:
    o Start with the score of the tentatively selected search result
    o Add the result of recursively calling Optimized Alignment on all subsequent lines through the given end line and from the tentatively selected search result time offset through the given end time.
- Return the highest "optimization score" found above, along with the tentative selection that produced it and all of the tentative selections returned by its associated recursive call

FIG. 4B

Blind Alignment

Given: start time, end time, start line, end line

- Compute the total number of alphanumeric letters on all of the lines to be assigned plus the number of letters on the last aligned line before the given start line
- Divide the duration of the given time window by the total number of letters to get the average time per letter
- Set the time index for each line based on the total number of letters before it times the average time per letter

TRANSCRIPT ALIGNMENT

CROSS-REFERENCE TO RELATED APPLICATION

This application claims the benefit of U.S. Provisional Application Ser. No. 60/379,291, filed May 10, 2002. This application is related to U.S. Ser. No. 09/799,385, filed on Mar. 5, 2001. Both these applications are incorporated herein by reference.

BACKGROUND

The invention relates to alignment of audio recordings with transcripts of the recordings.

Many current speech recognition systems include tools to form "forced alignment" of transcripts to audio recordings, typically for the purposes of training (estimating parameters for) a speech recognizer. One such tool was a part of the HTK (Hidden Markov Model Toolkit), called the Aligner, which was distributed by Entropic Research Laboratories. The Carnegie-Mellon Sphinx-II speech recognition system is also capable of running in forced alignment mode, as is the freely available Mississippi State speech recognizer.

The systems identified above force-fit the audio data to the transcript. Typically, some amount of manual alignment of the audio to the transcript is required before the automatic alignment process begins. The forced-alignment procedure assumes that the transcript is a perfect and complete transcript of all of the words spoken in the audio recording, and that there are no significant segments of the audio that contain noise instead of speech.

SUMMARY

In a general aspect, the invention features a method of alignment of transcripts in which there may be moderate transcript inaccuracies, untranscribed speech, and significant non-speech noise. No manual alignment is required as part of the method.

In one aspect, in general, the invention features a method for aligning an audio recording and a transcript comprising. A number of search terms are formed from the transcript. Each search term is associated with a location within the transcript. Possible locations of the search terms are determined in the audio recording. The audio recording and the transcript are then aligned using the possible locations of the search terms.

In another aspect, in general, the invention features a method for searching an audio recording. A search expression is accepted, and then a search is performed for spoken occurrences of the search expression in the audio recording. This search includes (a) searching for text occurrences of the search expression in a text transcript of the audio recording, and (b) searching for spoken occurrences of the search expression in the audio recording. Representations of the results of the searching for the spoken occurrences of the search expression are presented enabling access to portions of the audio recording corresponding to each of the results of the searching.

Aspects of the invention can include one or more of the following features:

Forming the search terms includes forming one or more search terms for each of a number of segments of the transcript.

Forming the search terms for each of the segments includes forming one or more search terms for each of a number of text lines of the transcript.

Determining possible locations of the search terms includes applying a word spotting approach to determine one or more possible locations for each of the search terms.

Determining the possible locations of the search terms includes associating each of the possible locations with a score characterizing a quality of match of the search term and the corresponding possible location.

The time-aligned transcript is provided as an output of the method.

A user interface is provided for browsing or searching the audio recording or the time-aligned transcript.

The audio recording and time-aligned transcript are packaged together in digital form, for example, on a CD, DVD, or in a single binary file.

The package also includes software for browsing or searching the audio recording or time-aligned transcript.

Aspects of the invention can include one or more of the following advantages:

The approach is robust to transcription gaps and errors, and to periods of non-speech signals in the audio recording.

DESCRIPTION OF DRAWINGS

FIG. 3 is pseudocode for a gap alignment procedure.

DESCRIPTION

1 Overview

Figure 1:
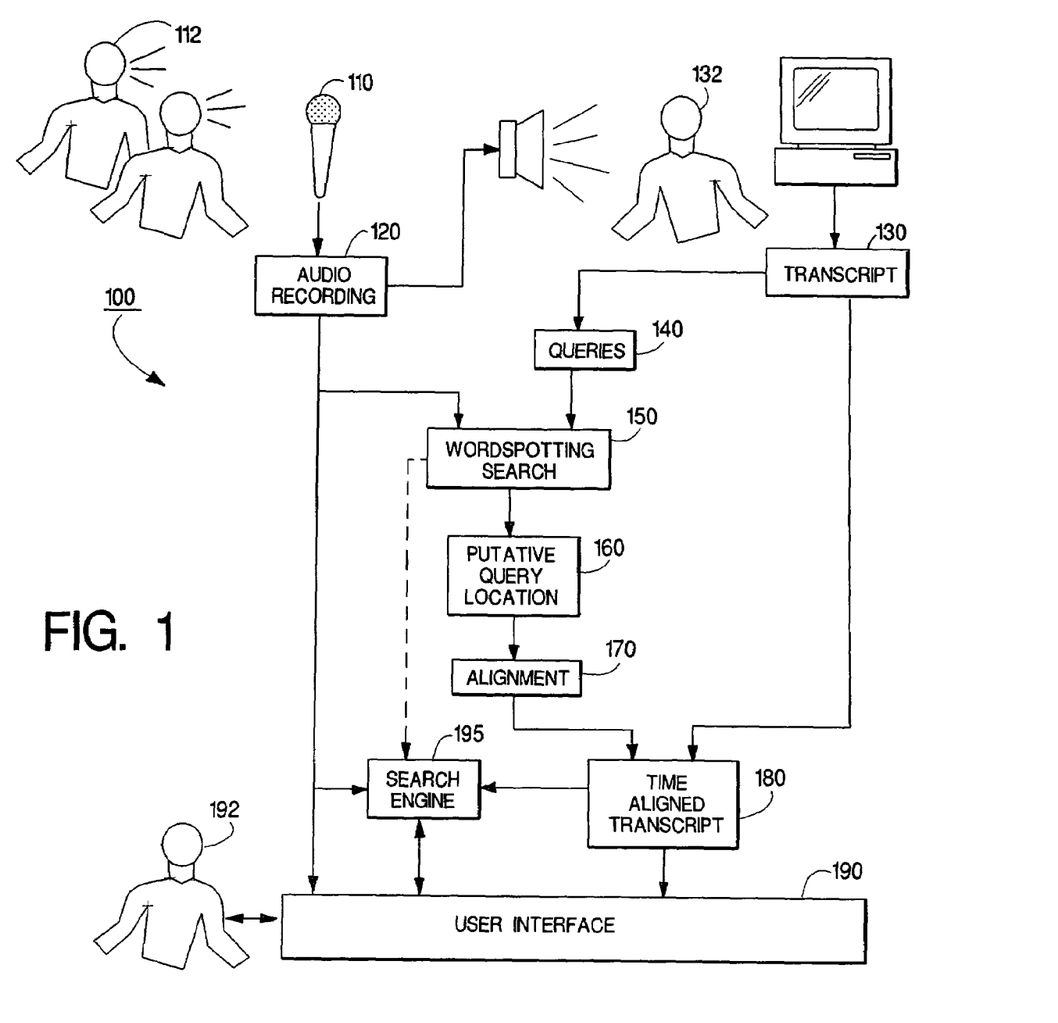
FIG. 1 is a diagram of a transcript alignment system.
Figure 2A:
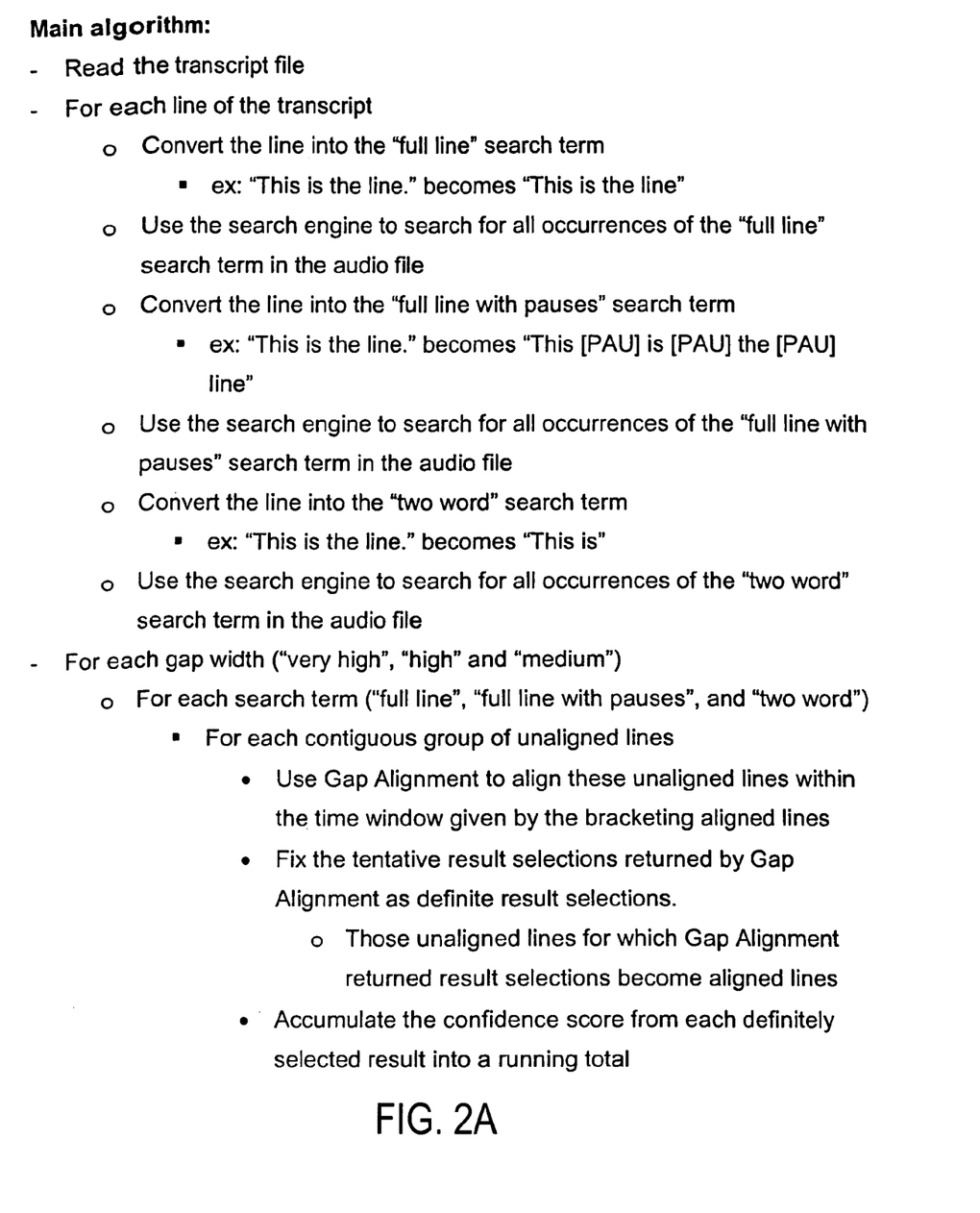
FIGS. 2A–B are pseudocode for the main algorithm.
Figure 2B:
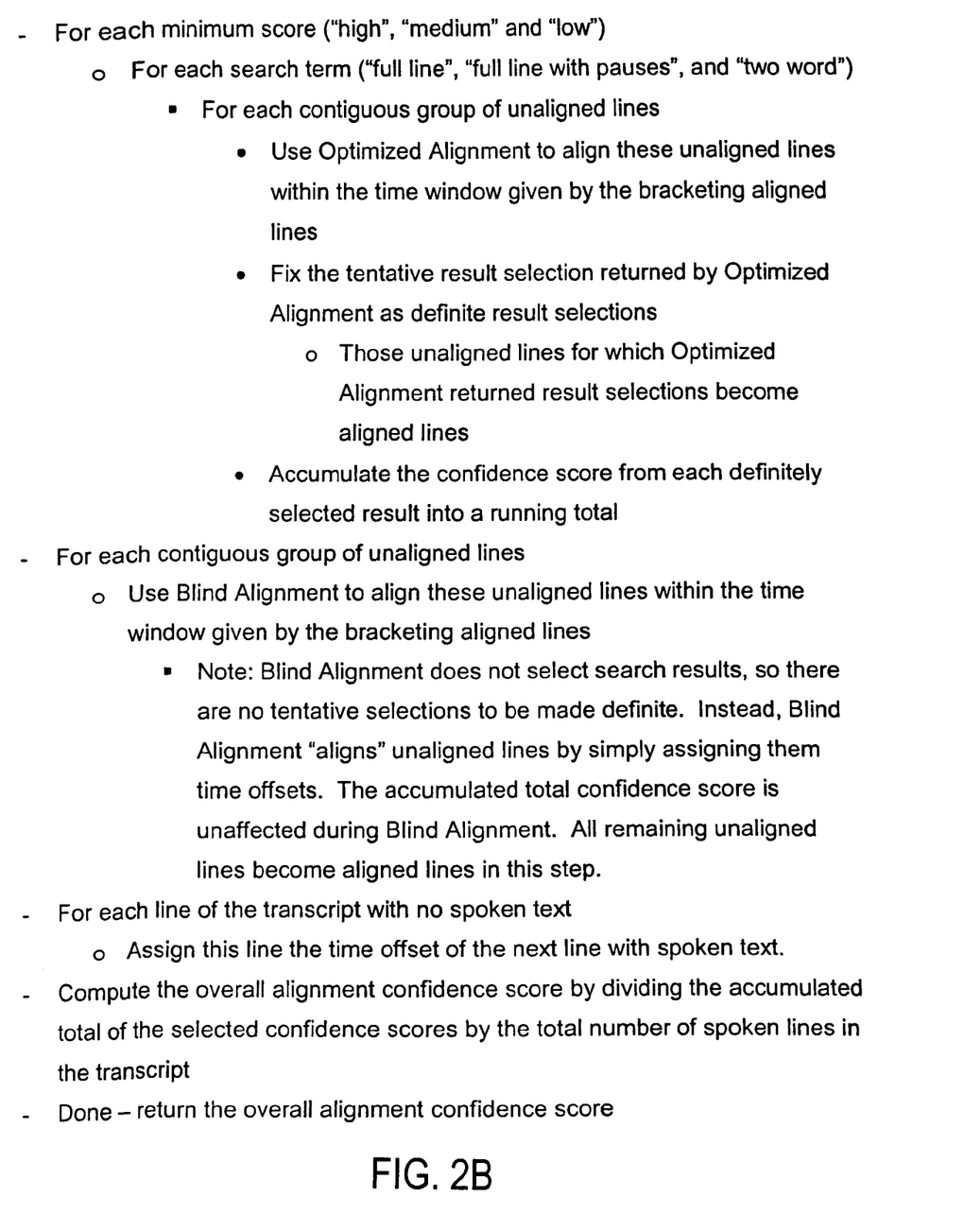
Figure 4A:
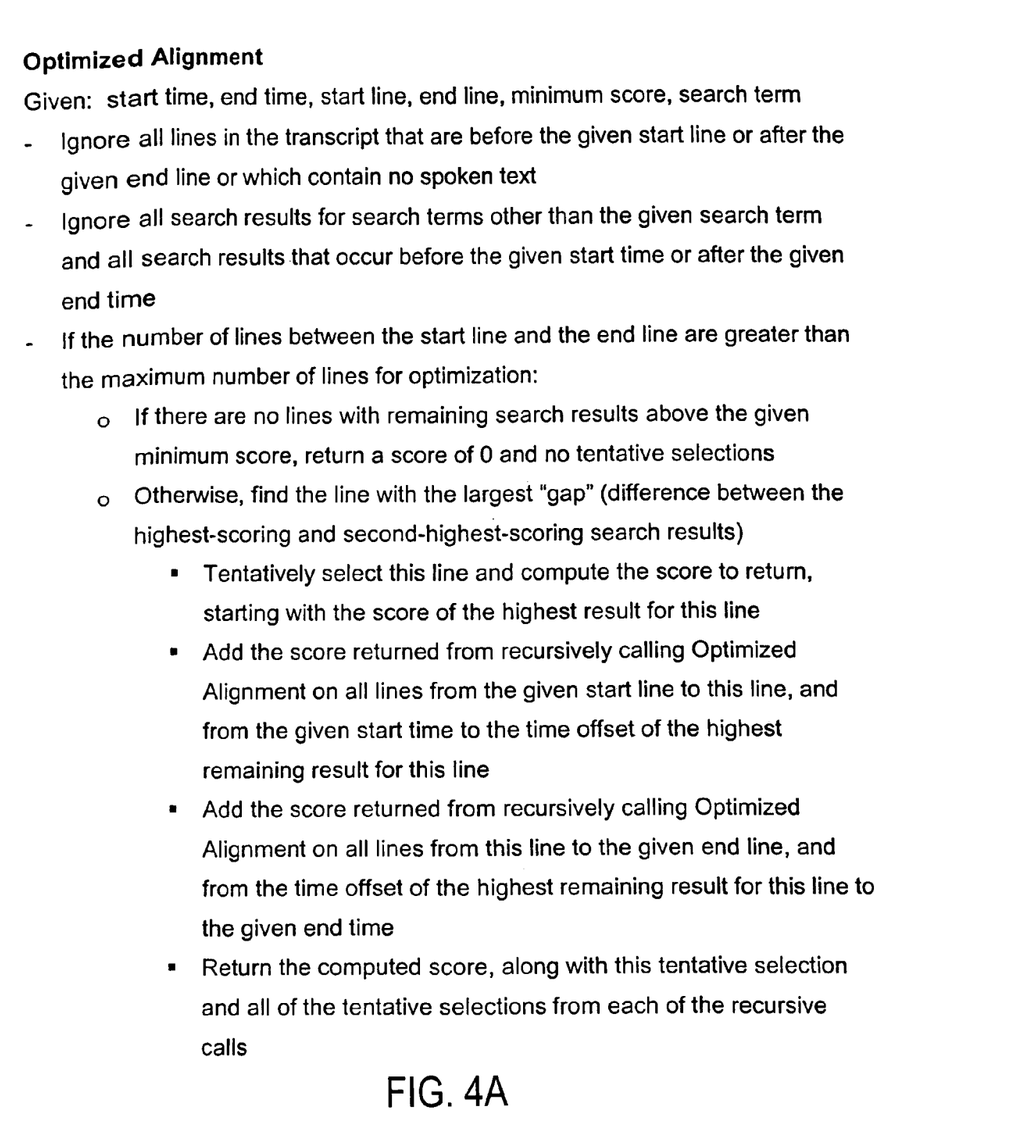
FIGS. 4A–B are pseudocode for an optimized alignment procedure.
Figure 4B:
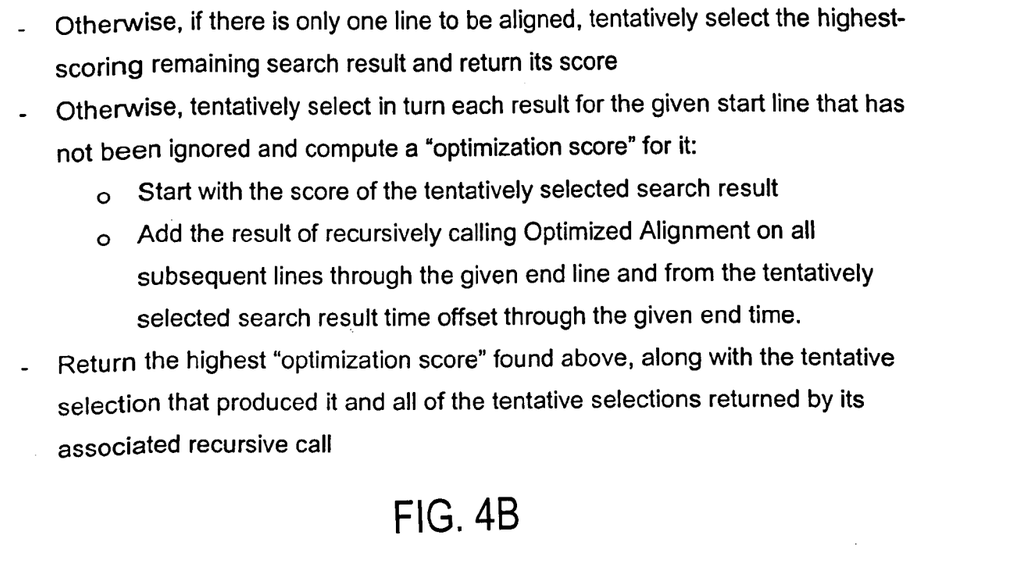
Figure 5:
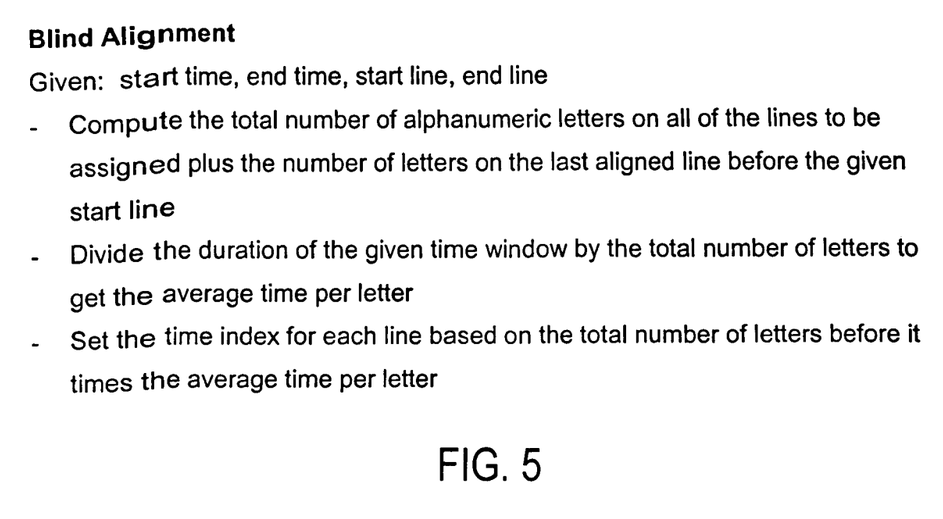
FIG. 5 is pseudocode for a blind alignment procedure.

Referring to FIG. 1, a transcript alignment system 100 is used to process an audio recording 120 of the speech of one or more speakers 112 that have been recorded through a microphone 110 or some other recording system. A transcript 130 of the audio recording is also processed by the system. As illustrated in FIG. 1, a transcriptionist 132 has listened to some or all of audio recording 120 and entered a text transcription on a keyboard. Alternatively, transcriptionist 132 has listened to speakers 112 live and entered the text transcription at the time speakers 112 spoke. Transcript 130 is not necessarily complete. That is, there may be portions of the speech that are not transcribed. The transcript may also have substantial portions that include only background noise when the speakers were not speaking. Transcript 130 is not necessarily accurate. For example, words may be misrepresented in the transcript. Furthermore, the transcript may have text that does not reflect specific words spoken, such as annotations or headings.

Generally, alignment of audio recording 120 and transcript 130 is performed in a number of phases. First, the text of transcript 130 is processed to form a number of queries 140, each query being formed from a segment of the transcript, such as from a single line of the transcript. The location in transcript 130 of the source segment for each query is stored with the queries. A wordspotting-based query search 150 is used to identify putative query location 160 in the audio recording. For each query, a number of time locations in audio recording 120 are identified as possible locations where that query term was spoken. Each of the putative query locations is associated with a score that characterizes the quality of the match between the query and the audio recording at that location. An alignment procedure 170 is used to match the queries with particular of the putative locations. This matching procedure is used to form a time-aligned transcript 180. Time-aligned transcript includes an annotation of the start time for each line of the original transcript that is located in the audio recording. A user 192 then browses the combined audio recording 120 and time-aligned transcript 180 using a user interface 190. One feature of this interface is that the user can use a wordspotting-based search engine 195 to locate search terms. The search engine uses both the text of time-aligned transcript 180 and audio recording 120. For example, if the search term was spoken but not transcribed, or transcribed incorrectly, the search of the audio recording may still locate the desired portion of the recording. User interface 190 provides a time-synchronized display so that the audio recording for a portion of the text transcription can be played to the user.

Transcript alignment system 100 makes use of wordspotting technology in the wordspotting query search procedure 150 and in search engine 195. One implementation of a suitable wordspotting based search engine is described in co-pending U.S. patent application Ser. No. 09/799,385, filed on Mar. 5, 2001. The wordspotting based search approach of this system has the capability to:

accepts a search term as input and provides a collection of results back with a confidence score and time offset for each     allows the caller to specify the number of search results to be returned, which may be unrelated to the number of actual occurrences of the search term in the audio.

Transcript alignment system 100 attempts to align lines of transcript 150 with a time index into audio recording 120. The overall alignment procedure carried out by transcript alignment system 100 consists of three main, largely independent phases, executed one after the other: gap alignment, optimized alignment, and blind alignment. The first two phases each align as many of the lines of the transcript to a time index into the media, and the last then uses best-guess, blind estimation to align any lines that could not otherwise be aligned.

2 Phase 0: Searching

The first two phases of alignment ("gap alignment" and "optimized alignment") depend on the results from searches executed for every line in the transcript. Therefore the first phase, which is carried out in wordspotting query search 150 (see FIG. 1), includes executing all of the searches and gathering the results.

Three search terms (queries) are constructed from each line of the transcript:

Full Line: The entire line as written in the transcript (less punctuation) (e.g., "This is the spoken line").

Full Line With Pauses: The entire line with pauses inserted between each word (e.g., "This [PAU] is [PAU] the [PAU] spoken [PAU] text").

Two Words: The first two words in the line, with no pause inserted between them (e.g., "This is").

Often, non-professional speakers will pause between words, interject "um"s, or "ah"s, or otherwise say something other than all of the words in a line of the transcript in a single smooth, continuous stream of speech. When spoken smoothly, the first search term will match well; if disfluencies are interjected, the second search term will match better.

In the case of mumbling or very large pauses between words, the third search term will match best. As we continue to develop this algorithm, we may find other search terms that would work well in certain cases. For example, it would be reasonable to insert pauses in place of punctuation characters only rather than between each word.

Acronyms and numbers are handled specially: because it is impossible to tell whether the text "SCSI" is pronounced "S C S I" or "scuzzy", or if "123" is "one hundred twenty three" or "one two three". So rather than include acronyms and numbers in the search, these are replaced with the ampersand operator, except at the beginning and end of the line, where they are simply dropped. The ampersand operator tells the search engine to search for the text before the operator to appear in close proximity (in time) with the text after the operator. Multiple acronyms or numbers may be dropped and replaced with a single ampersand operator. The ampersand operator is not counted as a word in the two-word search term, and no pauses are added before or after the ampersand operator in the search term with pauses added.

Next, all of the search terms are run through the word spotting based search engine, and all of the results collected. The number of search results requested for each search is a function of the length of the media—we request 6 search results per minute of media in the current implementation. That number is doubled for every ampersand operator in the search term, as those operators tend to dramatically reduce the number of search results returned.

Each search result consists of a confidence score and a time offset, and indicates the confidence (score) with which the search engine believes that the search term occurs at that time offset in the media. Because there are three search terms for each line in the transcript, there are three distinct sets of search results for each line.

3 Phase 1: Gap Alignment

The gap alignment process goes through all of the lines, looking for a search result for a line that looks like it is most probably correct. That search result is then (tentatively) selected as correct and a time index for that line is set at the time offset of the chosen search result. The file is then divided into two segments, and the process is repeated on each segment separately. This approach handles incomplete or moderately inaccurate transcriptions.

The search result that is "most probably correct" is a heuristic determination. The specific heuristic used here is:

the search result must be the highest-ranked result for that search term for that line     that the search result must have a score above a certain score threshold     the gap between the score of highest-ranked result and the score of next-highest ranked result must be greater than a certain gap threshold     if there is more than one line that has a search result that meets the above criteria, the line with the greatest gap is selected as "most probably correct".

Finding the result with the greatest gap between the highest and next-highest scoring results is actually more important than finding the result with the highest absolute confidence score, because it is important that the result be unique. If there are several high-scoring results for a line, it is impossible to tell which one actually corresponds to that specific line in the transcript. However, if there is one reasonably high-scoring result and all of the rest of the results score much lower, there can be some confidence that the one high-scoring result corresponds to that particular line in the transcript.

This process of selecting the most probable search result is carried out recursively, dividing the media into smaller and smaller segments. At each level, only those search hits that occur within the current segment of the media file are considered when selecting the highest-scoring and next-highest-scoring results—all results outside that segment are ignored. So there could be many search results that score higher than the highest search result for this segment of the media, and many more that score higher than the next-highest scoring result that is within that segment. However, all of those extraneous results will be ignored when computing the gap between the highest two search results that are within the current segment of the media file.

Selecting a search result that meets the heuristic of "most probably correct" that is not actually correct can have catastrophic effects on the accuracy of the resulting alignment, particularly early in the overall alignment process. So at every level of this recursive gap alignment process, the next-most-probably correct line (the line that also meets the criteria in terms of score and gap thresholds, but has the next-largest gap between the highest and second-highest result score) is also evaluated in the same way as the most probably correct line: that result is tentatively selected for that line, the segment of media is divided and the process is called recursively over the two sub-segments. If the next-most-probably-correct result produces a better alignment than the most probably correct one, than it is used instead, and all result selections from the most-probably-correct result are thrown out.

The basis for determining which of these two most probably correct search results produces the best alignment is the score returned from the subordinate recursive calls to the gap alignment procedure. Each level of this recursive process returns a score that is the sum of the score of the result selected at that level and the scores returned by its two subordinate recursive calls. Since these scores indicate the confidence that the search engine has for the search result, and since that the aggregate score returned is made up entirely of these confidence scores, the aggregate score returned from any given level of the recursive process is also a measure of the total confidence for the results selected by that level and all of its subordinate levels.

Also returned from each level of this recursive process is a set of tentative result selections. At each level, either the line with the "most probably correct" result or the line with the "next most probably correct" result will be tentatively selected, and that line will be tentatively marked as aligned. This tentative selection will then be returned along with all of the tentative selections from the subordinate recursive calls made for that result.

When the topmost level of this recursive process completes, the tentative selections that it returns are fixed as definite selections. Again, these selections consist of one of the returned audio search results for one of the search terms for a specific line. When these results are made definite, that line goes from being "unaligned" to being "aligned" to the media at the time offset given by the selected search result.

The first time this whole process is carried out, it is done using a very high gap threshold and only the search results from the "full line" search term. When it completes and the returned tentative result selections are made definite, the entire process is carried out again using the same high gap threshold and only the results from the "full line with pauses" search term. However, some (hopefully many) of the lines of the transcript have now already been aligned to specific time offsets in the media—and those alignments are considered fixed and unchangeable. So for the second (and all subsequent) times this process is carried out, each group of unaligned lines is considered independently, and only in relation to the segment of the media that falls between the time offsets of the enclosing aligned lines.

When the second pass is completed for all of the groups of unaligned lines and the tentative result selections are fixed as definite, a third pass is executed using the same high gap threshold and only the search results from the "two word" search term.

We know from experience with the audio search engine that some media produces excellent, high-scoring search results, while other media produces somewhat lower scores. For a human user, this is not a problem, as the results with the highest confidence will show up at the top of the list, regardless of the absolute score. In fact, the "gap" concept comes from experience with the audio search engine in which it became clear that the only way to tell which search results were correct and which were incorrect without listening to each one was to look for large gaps between a small number of high-scoring results and all of the lower-scoring incorrect results. However, since a significant gap in a high-scoring file will be larger than that in a low-scoring file, there is no single gap size to detect in the result list to determine correct results from incorrect ones.

When that completes, the gap threshold is lowered, and all three passes (one for each search term) are executed again. Finally, the gap threshold is lowered one more time, and all three passes are done again. All told, this results in nine passes:

full line search term, very high gap threshold
full line with pauses search term, very high gap threshold
two word search term, very high gap threshold
full line search term, high gap threshold
full line with pauses search term, high gap threshold
two word search term, high gap threshold
full line search term, medium gap threshold
full line with pauses search term, medium gap threshold
two word search term, medium gap threshold 4 Phase 2: Optimization Alignment Optimization alignment uses a brute force approach: it tries all possible combinations of search results for each line above a minimum score to find the sequence of results with the highest total score.

This is again a recursive process. At every level of the optimization process, all of the search results above a minimum score threshold for the first line in the group of unaligned lines are tentatively selected in turn, and for each one the process recursively calls itself on all of the remaining lines. The aggregate score for each tentatively-selected search result is the sum of the score for that result and the result returned from the recursive call of the optimization process over the remaining lines. The process returns the highest aggregate score and the sequence of tentative result selections for that line and all subsequent lines that produced the highest aggregate score. If there is no result for the first unaligned line that is above the minimum score threshold, then the result is simply the result returned from the recursive call to the process on all of the subsequent unaligned lines.

In order to keep this process from taking too long to run, there is a maximum threshold on the number of lines that can be optimize aligned at once. That is, if there are more contiguous unaligned lines in a group than is allowed by the threshold for optimized alignment, then the group is divided first by making a tentative selection of a search result above the minimum score threshold for one line and then using that to divide the original group of unaligned lines into two smaller groups. The optimized alignment process is then called on each of the two smaller groups. Because the first step in the process is to check the number of lines to be optimized, the smaller groups may themselves be similarly split before the optimization process described above actually begins. When dividing a group of unaligned lines, the line used to make the division is the line with the greatest gap between the highest-scoring search result and the next highest scoring search result, where the highest scoring search result is above the minimum score threshold.

Like the gap alignment, when the topmost level of this recursive process completes, the tentatively-selected lines are fixed as definite selections and the lines go from being marked "unaligned" to being marked "aligned". Also like the gap alignment process, this process is performed over each group of unaligned lines separately.

The first time this whole optimized alignment process runs, the minimum score threshold is set high and the only search results that are considered are those for the "full line" search term. After the process completes and any tentative selections returned are fixed as definite selections, the process is repeated for the "full line with pauses" search term, with the same high score threshold. The process is then executed again with the same score threshold and the search results from the "two word" search term. The score threshold is then lowered and all of these three steps are repeated. Finally, the score threshold is lowered again and all of these steps are repeated on last time. This give nine total executions of the optimized alignment process, much like the gap alignment process.

5 Phase 3: Blind Alignment

The final phase of alignment is not based on search results at all—instead a simple, blind mathematical approach is used. The simple formula is based on the (invalid, but workable) assumption that every alphanumeric letter takes the same amount of time to speak. So first, the time window in which these lines must have been said is given by the time offset of the last aligned line immediately before this group of unaligned lines and that of the first aligned line after the unaligned group. The total number of letters spoken in that time window is the total number of letters in the unaligned lines plus the number of letters on the last aligned line immediately before the first unaligned line. The letters from the last aligned line are included because the time offset for that line reflects the time the speaker began speaking the text on that line—so the time required to finish speaking the text on that line must be taken into account. The time window is then divided by the total number of letters to produce an average time per letter. This statistic is then used to "align" each line by multiplying the number of letters on all of the unaligned lines before it plus the number of letters on the last unaligned line by the average time per letter.

When this step is complete, all lines in the transcript that have spoken text will have been aligned to the media.

6 Scoring

It is valuable to have some simple metric by which to judge how well the transcript was aligned to the media. This can provide feedback to the recording technician regarding the quality of the recording or can be taken to reflect the quality of the transcript. Also, this score can be used to estimate the number of alignment errors that are likely to have been made during the alignment process.

Through the gap alignment and optimized alignment phases, specific search results were first tentatively selected and then fixed or definitely selected for many of the lines in the transcript—at which point the time offset of the definitely selected search result was taken to be the time offset at which that line occurred in the media, and the line was marked as "aligned". The overall alignment score metric is the average score for the definitely selected search results for each spoken line of the transcript. If there is no spoken text on the line to align, it is ignored in the score calculation. Those lines that could not be aligned by selecting a search result, and which were therefore "aligned" through the blind alignment process, are included in the average but contribute a score of zero.

7 Pseudocode

FIGS. 2–5 include pseudocode for procedures introduced above.

8 User Interface

Figure 6:
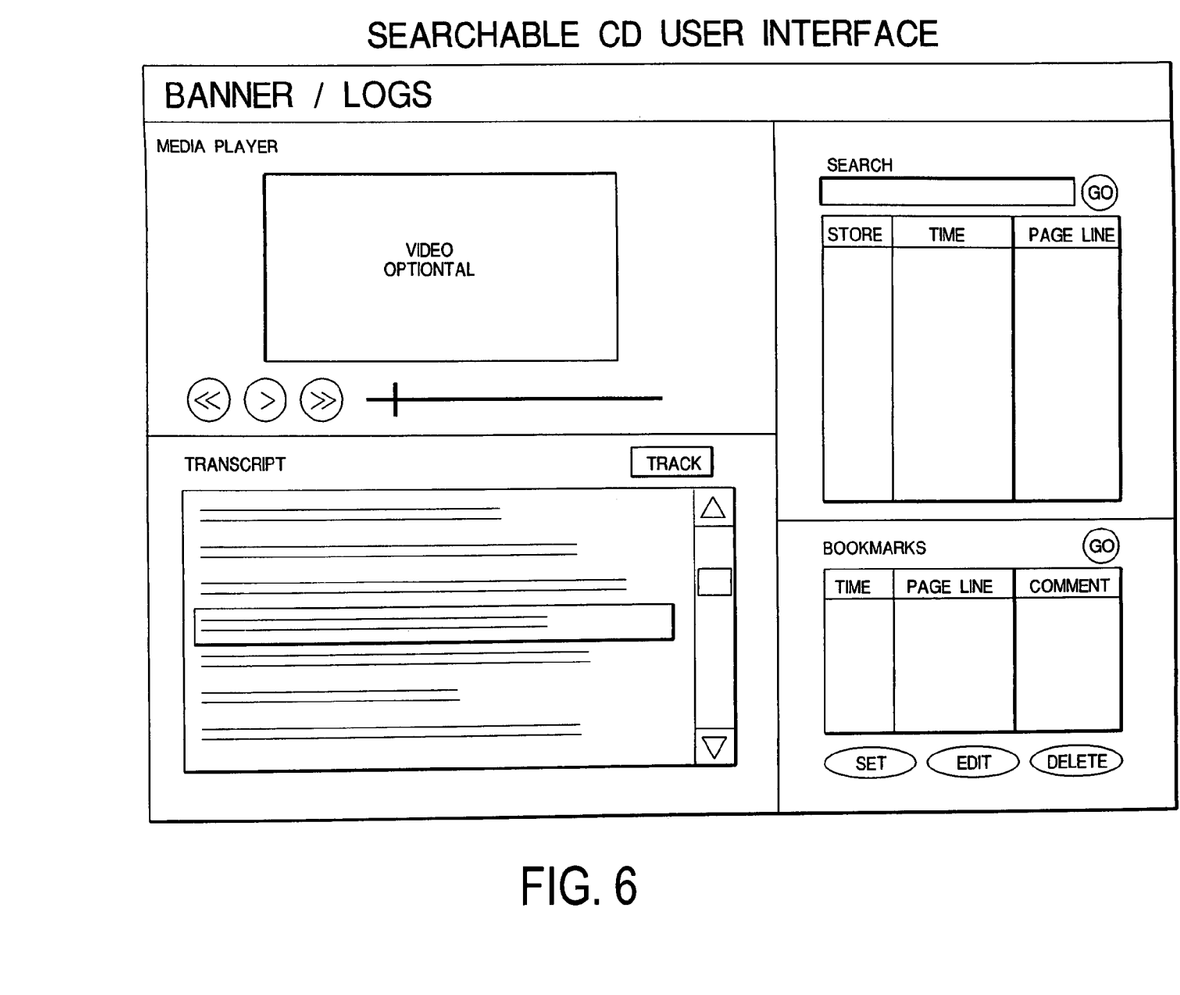
FIG. 6 is a diagram that illustrates a user interface for the transcript alignment system.

FIG. 6 illustrates user interface 190 for displaying an aligned transcript to the user and allowing them to use it to provide enhanced access to the media.

The interface includes the Media Player and Transcript windows. So long as the Track button in the Transcript window is selected, these windows will be tied together: the Transcript will always have the line currently being played in media player centered and highlighted in its window. If the user uses the slider in the Media Player window to adjust the current playback position of the media, the Transcript window will immediately jump to the appropriate line in the transcript for the new media position. Conversely, if the user clicks on a line in the Transcript window other than the one currently highlighted, that line will become highlighted and the Media Player window will adjust the current playback position of the media to correspond to the time offset of the newly-selected line. The highlighted line in the Transcript window will change from one line to the next as the Media Player window plays the media. When the Track button on the Transcript window is not selected, the Transcript window continues to highlight the line that corresponds to the current position in the media Player window, but does not keep that line centered. This allows the user to quickly skim through the transcript without thrashing the Media Player window.

Next, the search window allows the user to simultaneously search the audio portion of the media and the transcript simultaneously. When the user enters a search term and presses the go button, an audio search engine is used to search the media file for the search term, and a text search engine is used to search the transcript. The results from both search engines are then compiled into a single list, using the time offsets given in the aligned transcript to eliminate duplicates—instances where both search engines found the same occurrence of the search term. The results from the text search engine are presented to the user first in the result list with the maximum confidence score, followed by the results from the audio search engine in confidence-score order. When the user clicks on a result in the result list, the Media Player window will queue the media to that location, and the Transcript will scroll to bring the corresponding line of the transcript to the center of the window and highlight it.

Lastly, the Bookmarks window will allow a user to mark a specific location in the media and, by extension, the transcript and provide a comment on the reason that the bookmark was placed. Clicking on a bookmark behave exactly the same way as clicking on a search result.

9 Packaging

The result of time aligning and audio recording to the transcript is optionally packaged together in digital form, for example, on a Compact Disk (CD), Digital Versatile Disk (DVD), in a single computer archive, or some other form of digital container. For instance, in the case of a CD, the audio recording, the time-aligned transcript, and software to implement the user interface and the search engine are all stored on the CD. A user can then use the CD to browse and search the audio recording.

10 Applications

The approach described above is applicable to a variety of situations including the following:
- alignment of court transcripts to audio recordings of those transcripts
- alignment of journalistic or insurance interviews with recordings of those interviews
- alignment of television closed captioning to a television program
- alignment of monitored data to transcripts, for example, to align transcripts of air-traffic communication to recordings in a crash investigation
- alignment of movie or theatrical scripts to audio recordings of actors performing the scripts (note that in this case, the "transcript" comes before the production of the original audio, as opposed to the audio be produced and then the transcript being made during or after the production of the audio).

11 Alternatives

In alternative versions of the system, other audio search techniques can be used. These can be based on word and phrase spotting techniques, or other speech recognition approaches.

In alternative versions of the system, rather than working at a granularity of lines of the text transcript, the system could work with smaller or larger segments such as words, phrases, sentences, paragraphs pages.

Other speech processing techniques can be used to locate events indicated in transcript 130. For example, speaker changes may be indicated in transcript 130 and these changes are then located in audio recording 120 and used in the alignment of the transcript and the audio recording.

The approach can use other or multiple search engines to detect events in the recording. For example, both a word spotter and a speaker change detector can be used individually or in combination in the same system.

The approach is not limited to detecting events in an audio recording. In the case of aligning a transcript or script with a audio-video recording, video events may be indicated in the transcript and located in the video portion of the recording. For example, a script may indicate where scene changes occur and a detector of video scene changes detects the time locations of the scene changes in the video.

The approach described above is not limited to audio recordings. For example, multimedia recordings that include an audio track can be processed in the same manner, and the multimedia recording presented to the user. For example, the transcript may include closed captioning for television programming and the audio recording may be part of a recorded television program. The user interface would then present the television program with the closed captioning.

Transcript 130 is not necessarily produced by a human transcriptionist. For example, a speech recognition system may be used to create an transcript, which will in general have errors. The system can also receive a combination of a recording and transcript, for example, in the form of a television program this includes closed captioning text.

The transcript is not necessarily formed of full words. For example, certain words may be typed phonetically, or typed "as they sound." The transcript can include a stenographic transcription. The alignment procedure can optionally work directly on the stenographic transcript and does not necessarily involve first converting the stenographic transcription to a text transcript.

Alternative alignment procedures can be used instead of or in addition to the recursive approach described above. For example, a dynamic programming approach could be used to select from the possible locations of the search terms. Also, an in which search terms and a filler model are combined in a grammar can be used to identify possible locations of the search terms using either a word spotting or a forced recognition approach.

The system can be implemented in software that is executed on a computer system. Different of the phases may be performed on different computers or at different times. The software can be stored on a computer-readable medium, such as a CD, or transmitted over a computer network, such as over a local area network.

It is to be understood that the foregoing description is intended to illustrate and not to limit the scope of the invention.

What is claimed is:

1. A method for aligning an audio recording and a transcript comprising:
   forming a plurality of search terms from the transcript, each search term associated with a location within the transcript;
   determining zero or more putative locations of each of the search terms in a time interval of the audio recording, including for at least some search terms determining multiple putative locations in the time interval of the audio recording; and
   after determining the putative locations, aligning the time interval of the audio recording and the transcript using the determined putative locations of the search terms, including, for at least some of the search terms, selecting one of the putative locations of the search term for aligning with the location within the transcript that is associated with the search term.

2. The method of claim 1 wherein forming the search terms includes forming one or more search terms for each of a plurality of segments of the transcript.

3. The method of claim 2 wherein forming the search terms for each of the segments includes forming one or more search terms for each of a plurality of text lines of the transcript.

4. The method of claim 1 wherein determining putative locations of the search terms includes applying a word spotting approach to determine one or more putative locations for each of the search terms.

5. The method of claim 1 wherein determining the putative locations of the search terms includes associating each of the putative locations with a score characterizing a quality of match of the search term and the corresponding putative location.

6. The method of claim 1 further comprising packaging the audio recording, the transcript, and data representing the alignment of the audio recording and the transcript on one or more computer-readable storage devices.

7. The method of claim 6 further comprising storing software on the one or more computer-readable storage devices comprising processor code for accessing the audio recording according to the alignment of the audio recording and the transcript.

8. The method of claim 1 wherein the transcript includes speaker indications, and aligning the audio recording and the transcript includes using speaker characteristics in the audio recording to match the speaker indications.

9. The method of claim 1 wherein the audio recording is associated with a video recording and the transcript includes indications of video events, and aligning the audio recording and the transcript includes using video characteristics in the associated video recording to match the video event.

10. The method of claim 1 wherein the audio recording includes a recording of a court session, and the transcript includes a court transcript.

11. The method of claim 1 wherein the audio recording includes audio associated with a television program, and the transcript includes a closed captioning text for the television program.

12. The method of claim 1 wherein the audio recording includes air-traffic control recordings, and the transcript includes an air-traffic control transcript.

13. The method of claim 1 wherein the audio recording includes audio associated with a performance, and the transcript includes a script used for the performance.

14. The method of claim 1 wherein the time interval of the audio recording comprises the audio recording in its entirety.

15. The method of claim 1 wherein the aligning comprises using a gap alignment.

16. The method of claim 1 wherein the aligning comprises using an optimization alignment.

17. The method of claim 1 wherein the aligning comprises using a blind alignment.

18. The method of claim 1 wherein aligning comprises aligning the time interval of the audio recording and the transcript using the determined putative locations of the search terms until all of the search terms are marked as aligned, and the aligning further comprises:
 dividing the time interval of the audio recording into a plurality of second time intervals; and
 performing the aligning on each of the plurality of second time intervals.

19. The method of claim 1 wherein determining zero or more putative locations of each of the search terms includes not determining any putative locations of at least some of the search terms in the time interval.

20. The method of claim 19 wherein aligning the time interval of the audio recording and the transcript includes omitting portions of the transcript from the alignment.

21. The method of claim 1 wherein aligning the time interval of the audio recording and the transcript includes aligning an incomplete transcript of the audio recording.

22. The method of claim 1 wherein aligning the time interval of the audio recording and the transcript includes aligning a transcript that includes text that does not reflect words spoken in the audio recording.

23. The method of claim 22 wherein aligning the time interval of the audio recording and the transcript includes discarding at least some of the search terms.

* * * * *

UNITED STATES PATENT AND TRADEMARK OFFICE
CERTIFICATE OF CORRECTION

| | | |
|---|---|---|
| PATENT NO. | : 7,231,351 B1 | Page 1 of 1 |
| APPLICATION NO. | : 10/384273 | |
| DATED | : June 12, 2007 | |
| INVENTOR(S) | : Griggs | |

It is certified that error appears in the above-identified patent and that said Letters Patent is hereby corrected as shown below:

On the Title Page Item -56-
Under FOREIGN PATENT DOCUMENTS GB 0 877 378 A2* 11/1998 should read:

-- EP 0 877 378 A2* 11/1998 --

Signed and Sealed this

Thirteenth Day of May, 2008

JON W. DUDAS
*Director of the United States Patent and Trademark Office*